United States Patent
Cenciarelli et al.

(10) Patent No.: US 8,265,664 B1
(45) Date of Patent: Sep. 11, 2012

(54) APPARATUS AND METHODS FOR COMMUNICATING TEXT MESSAGES USING MULTIPLE COMMUNICATION MODES

(75) Inventors: Fulvio Cenciarelli, Suwanee, GA (US); Coulter C. Henry, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 829 days.

(21) Appl. No.: 11/209,884

(22) Filed: Aug. 23, 2005

(51) Int. Cl.
*H04W 4/00* (2009.01)
*H04B 7/00* (2006.01)
*H04M 1/00* (2006.01)
*H04W 40/00* (2009.01)

(52) U.S. Cl. .... 455/466; 455/41.2; 455/445; 455/552.1; 455/553.1

(58) Field of Classification Search .......... 455/466, 455/41.2, 500, 552.1, 553.1, 445
See application file for complete search history.

(56) References Cited

U.S. PATENT DOCUMENTS

| | | | | |
|---|---|---|---|---|
| 6,839,542 B2 * | 1/2005 | Sibecas et al. | | 455/41.2 |
| 7,257,426 B1 * | 8/2007 | Witkowski et al. | | 455/569.2 |
| 2004/0209593 A1 * | 10/2004 | Alberth et al. | | 455/403 |
| 2005/0020286 A1 * | 1/2005 | Lazaridis et al. | | 455/466 |
| 2005/0202825 A1 * | 9/2005 | Puranik et al. | | 455/450 |
| 2005/0266798 A1 * | 12/2005 | Moloney et al. | | 455/41.2 |

* cited by examiner

*Primary Examiner* — Wesley Kim
(74) *Attorney, Agent, or Firm* — Moazzam & Associates, LLP

(57) ABSTRACT

An apparatus and methods for communicating text messages to the recipients' communication devices utilizes multiple communication modes, including, but not limited to, network-based and non-network based communication modes or methods. Generally, the network-based communication mode utilizes a messaging communication network to communicate text messages over relatively large distances, and the non-network-based communication mode utilizes a proximity communication transport mechanism to communicate text messages over relatively small distances. The non-network communication transport mechanism includes, for example, the Bluetooth proximity communication transport mechanism and/or the unlicensed free radio spectrum. The apparatus is operable in either of the communication modes or in an auto-select communication mode in which the apparatus initially attempts to communicate text messages via a proximity communication transport mechanism and if unsuccessful, subsequently communicates text messages via a messaging communication network. The apparatus is configurable to operate in any of the communication modes.

13 Claims, 8 Drawing Sheets

FIG. 2C
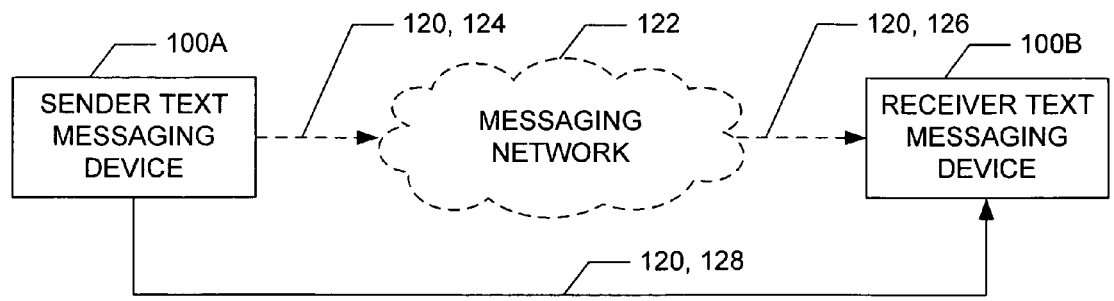
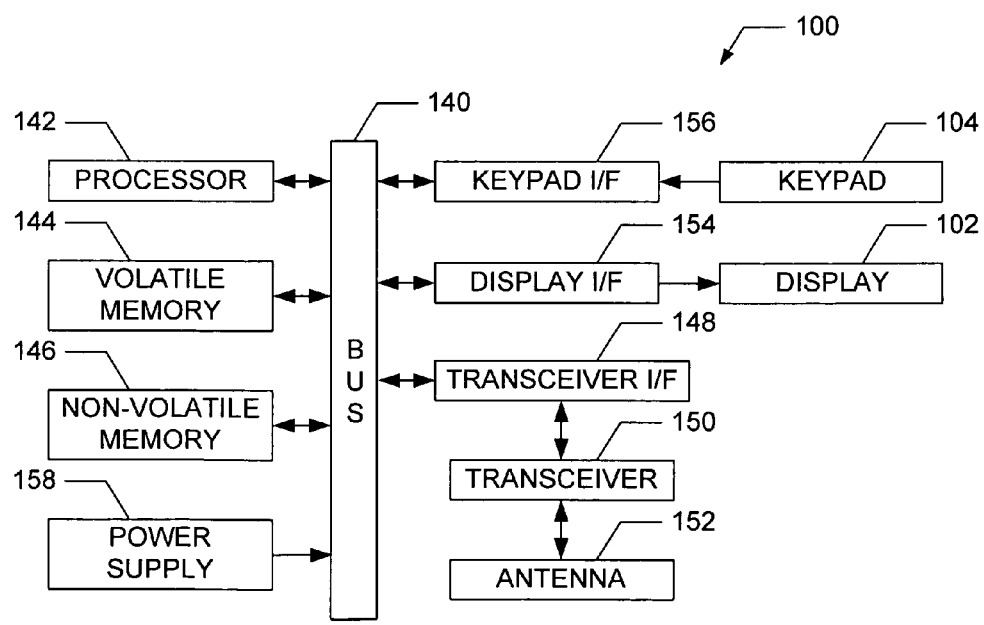
FIG. 3

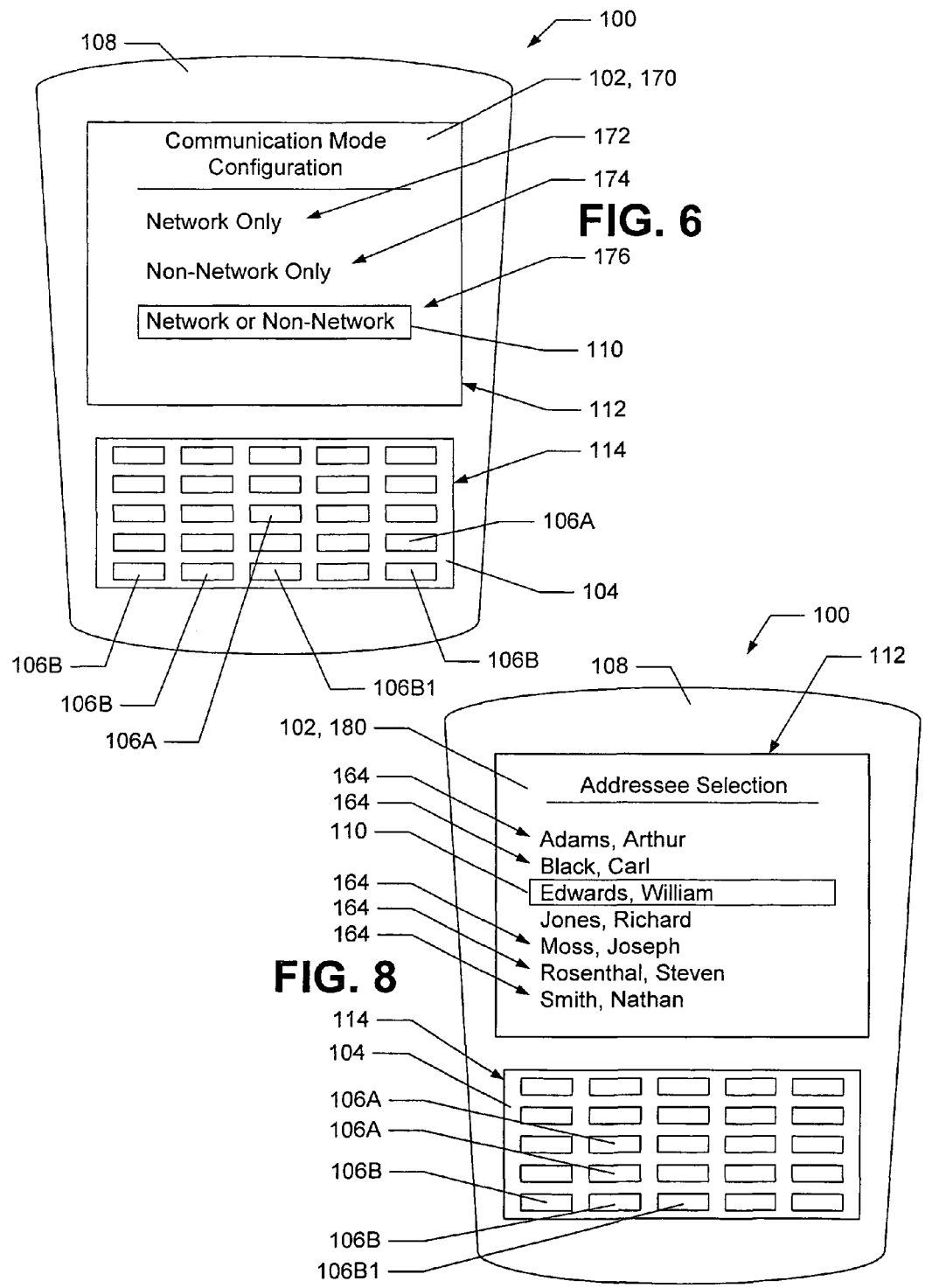

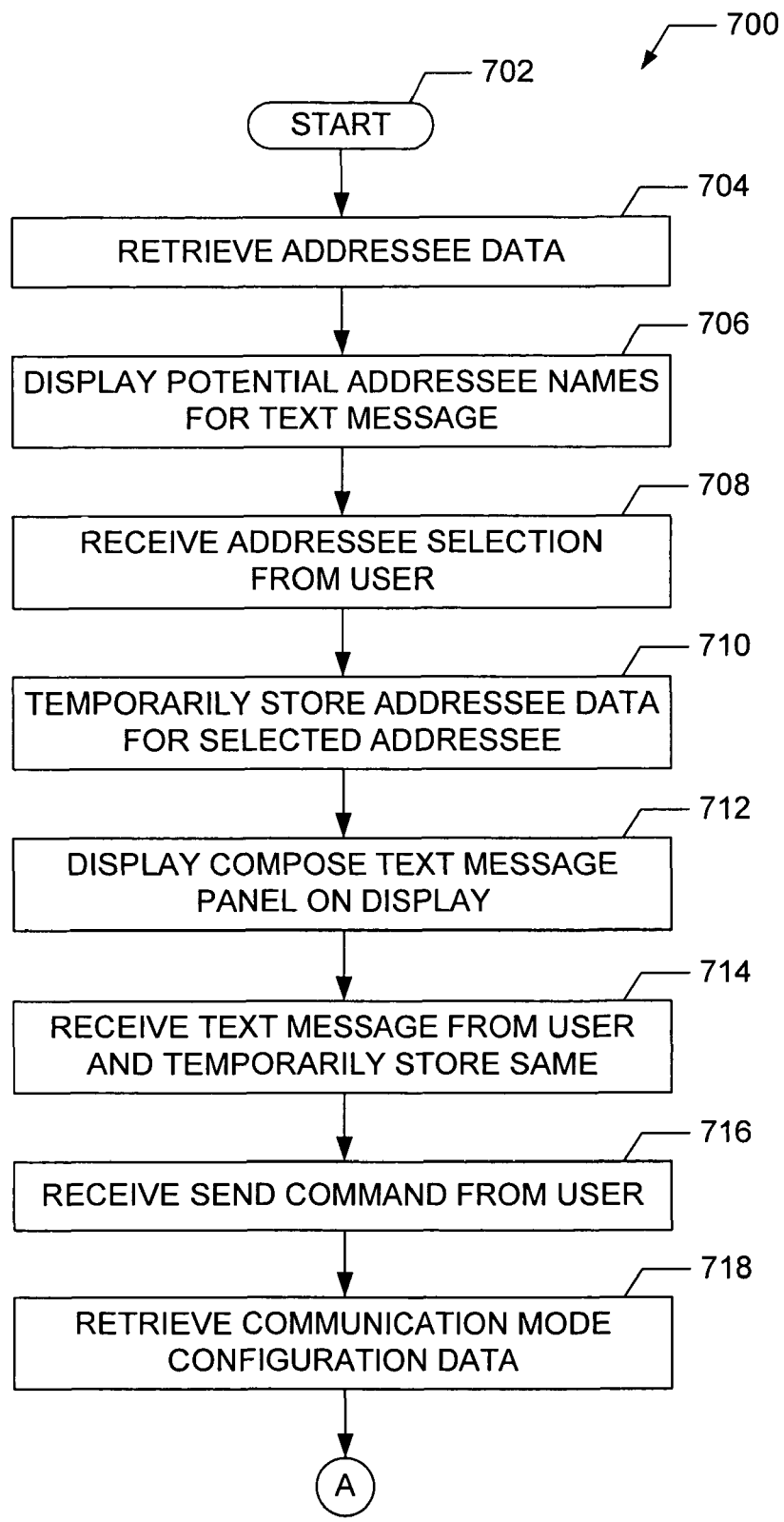

APPARATUS AND METHODS FOR COMMUNICATING TEXT MESSAGES USING MULTIPLE COMMUNICATION MODES

BACKGROUND OF THE INVENTION

1. Field of the Invention

The present invention relates generally to the field of wireless communication devices and more particularly to wireless communication devices and methods for communicating text messages using network and non-network communication modes.

2. Description of the Related Art

For many years, businesses have utilized text messaging to communicate with their employees who are not always present at a particular location. Such businesses include, for example, service companies having service technicians who provide installation or repair services for a customer at one location and then move on to another location to provide installation or repair services to another customer at another location. By equipping their service technicians with text messaging communication devices (e.g., text-enabled pagers) and by having their dispatchers communicate text messages with their service technicians, such service companies have been able to track the progress of service calls and to direct service technicians to their next service calls.

Today, text messaging has become an increasingly popular method of communication as businesses and individuals have realized that text messaging not only allows communication with persons who are not always present at a particular location, but also enables communication with such persons in a way that is not disruptive to others in the proximity of such persons. Therefore, text messaging may be used, for example, to communicate messages to persons who are present in meetings or at presentations without disrupting the meetings or presentations. As a consequence, text messaging is often used today for communication between persons who may be in the same building, on the same floor of a building, or even within thirty (30) feet of each other.

Most text messages are communicated from the text messaging devices of senders to the text messaging devices of respective receivers via the messaging communication networks of communication carriers. When the senders and receivers are separated by a substantial distance, the use of the messaging communication networks is necessary. However, when the senders and receivers are not separated by a substantial distance and are, instead, in relative close proximity, the use of messaging communication networks for communicating text messages between such senders and receivers consumes valuable and expensive communication network resources that might otherwise be used for communicating text messages between senders and receivers who are separated by substantial distances. Further, such use of messaging communication networks for communicating text messages between senders and receivers in relative close proximity may reduce communication carrier revenues if some of the network resources consumed for communicating such text messages are also used by the communication carrier to provide higher revenue generating wireless voice communication services.

Therefore, there is a need in the industry for apparatuses and methods for communicating text messages that use a messaging communication network to communicate text messages if respective senders and receivers are separated by a substantial distance and that do not use a messaging communication network to communicate text messages if respective senders and receivers are in relative close proximity, and that address these and other problems, deficiencies, and shortcomings of the industry.

SUMMARY OF THE PRESENT INVENTION

Broadly described, the present invention comprises an apparatus and methods for communicating text messages using multiple communication modes. More particularly, the present invention comprises an apparatus and methods for communicating text messages to communication devices of text message recipients using network-based and non-network-based communication modes. Generally, the network-based communication mode utilizes a messaging communication network to communicate text messages over relatively large distances and the non-network-based communication mode utilizes a proximity communication transport mechanism to communicate text messages over relatively small distances. The apparatus is operable, according to the methods described herein, in either of the communication modes or in an auto-select communication mode in which the apparatus initially attempts to communicate text messages via a proximity communication transport mechanism and if unsuccessful, subsequently communicates text messages via a messaging communication network. Further, the apparatus is configurable by a user thereof to operate in either of the communication modes or in the auto-select communication mode.

According to an exemplary embodiment of the present invention, the apparatus comprises a wireless text messaging device having a user interface for receiving a text message, addressee information, a selection of an addressee, and a communication mode configuration selection input by a user thereof. The wireless text messaging device further comprises circuitry and/or components for communicating the input text message to a selected addressee via multiple communication modes, including without limitation, a network-based communication mode and a non-network-based communication mode. The circuitry and/or components of the wireless text messaging device are adapted to communicate such text message, in accordance with the user communication mode configuration selection, via a messaging communication network or a non-network communication transport mechanism. The circuitry and/or components of the wireless text messaging device are further adapted, in accordance with user communication mode configuration selection, to attempt to communicate the text message to a receiver's text messaging device initially via a non-network communication transport mechanism and if unsuccessful, via a messaging communication network. The non-network communication transport mechanism includes, but is not limited to, the Bluetooth proximity communication transport mechanism, the unlicensed free radio spectrum, and/or the ultra-high frequency electromagnetic spectrum.

Advantageously, by enabling the communication of text messages via multiple communication modes including network-based and non-network-based communication modes, the apparatus of the present invention optimizes the communication of text messages to best utilize the valuable resources of a messaging communication network for communicating text messages between senders and respective receivers thereof that are located distant from one another. The apparatus of the present invention also allows a sender of text messages to avoid charges or the consumption of valuable air time minutes for the communication of such text messages when the receivers thereof are located proximate to the sender. Additionally, because the apparatus of the present invention is configurable to automatically and seamlessly attempt to communicate text messages initially via a non-network-based communication mode and if unsuccessful, then via a network-based communication mode, such benefits inure to a communication carrier and to a user thereof in a substantially transparent manner.

Other advantages and benefits of the present invention will become apparent upon reading and understanding the present specification when taken in conjunction with the appended drawings.

BRIEF DESCRIPTION OF THE DRAWINGS

FIGS. 2A-2C are block diagram representations of different communication modes in which the wireless text messaging device of FIG. 1 is operable in accordance with the exemplary embodiment of the present invention.

FIG. 3 is a block diagram representation of the wireless text messaging device of FIG. 1 and hardware components thereof in accordance with the exemplary embodiment of the present invention.

FIG. 6 is a pictorial representation of the wireless text messaging device of FIG. 1 displaying a communication mode configuration panel in accordance with the exemplary embodiment of the present invention.

FIGS. 7A-7C are a flowchart representation of a method for communicating a text message used by the wireless text messaging device of FIG. 1 in accordance with the exemplary embodiment of the present invention.

FIG. 8 is a pictorial representation of the wireless text messaging device of FIG. 1 displaying an addressee selection panel in accordance with the exemplary embodiment of the present invention.

DETAILED DESCRIPTION OF THE INVENTION

Figure 1:
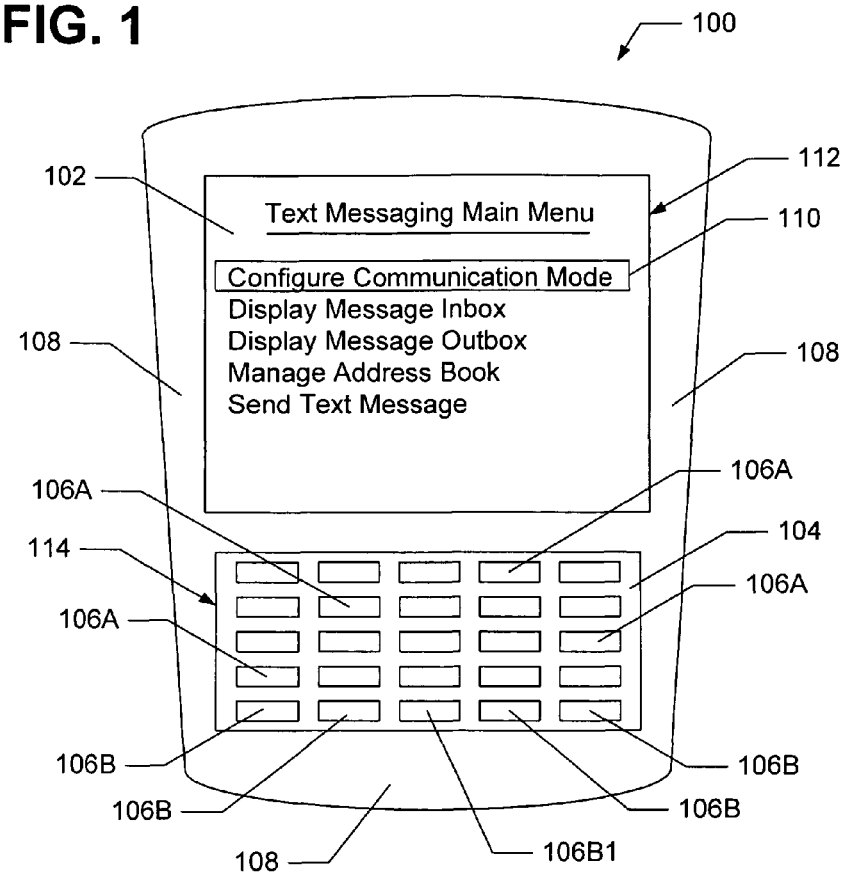
FIG. 1 is a pictorial representation of a wireless text messaging device for sending and receiving text messages using multiple communication modes and for performing related functions in accordance with an exemplary embodiment of the present invention.

Referring now to the drawings in which like numerals represent like elements or steps throughout the several views, FIG. 1 displays a pictorial representation of a wireless text messaging device 100 for sending and receiving text messages using multiple communication modes and for performing related functions in accordance with an exemplary embodiment of the present invention. The wireless text messaging device 100 (also sometimes referred to herein as the "text messaging device 100" or the "text messaging communication device 100") is operable, as described in more detail below, to communicate text messages with another communication device via a plurality of communication modes that include, but are not limited to, a first communication mode utilizing a conventional messaging network and a second communication mode not utilizing a conventional messaging network. The wireless text messaging device 100 is configurable by a user thereof, through received user input, to use only a designated communication mode (e.g., network only or non-network only) for the communication of a text message or to automatically select a communication mode (e.g., network or non-network) for the communication of a text message. Generally, the wireless text messaging device 100 comprises a device commonly referred to as a wireless pager, but may comprise a wireless communication device such as a wireless telephone, wireless personal digital assistant, or other device that is capable of communicating text messages with other communication devices.

According to the exemplary embodiment described herein, the wireless text messaging device 100 comprises a display 102, a keypad 104 including a plurality of keys 106, and a housing 108 as illustrated in FIG. 1. The display 102 is adapted to present information to a user including, for example and not limitation, menus of selectable items that correspond respectively to various functions performable by the wireless text messaging device 100, to configurable communication modes, and to potential addressees for receipt of a text message or for editing of information associated with such potential addressees. Such functions comprise, without limitation, the configuration of a communication mode, the display of text messages received by the wireless text messaging device 100 and then present in the device's message inbox, the display of text messages previously sent by the wireless text messaging device 100 and then present in the device's message outbox, the management of an address book of potential addressees for receiving text messages and information related thereto, and the composing and sending of text messages. The display 102 is also adapted to display text messages that have been received or sent by the wireless text messaging device 100, and to display text messages as they are being composed by a user of the wireless text messaging device 100. Additionally, the display 102 is adapted to display a movable cursor 110 that is positionable by a user to select a particular selectable item and/or that may indicate the device's currently configured communication mode. Typically, the display 102 comprises a monochrome, alphanumeric active matrix liquid crystal display, but may comprise a color, alphanumeric active matrix liquid crystal display or any other form of display that is operable to provide the functionality described herein. Further, the display 102 may comprise a touch screen display that enables the receipt of inputs from a user touching or pressing the touch screen display with a finger, stylus, or other implement.

The plurality of keys 106 of the keypad 104 includes keys 106 that enable a user to provide input to the wireless text messaging device 100 and, hence, enable the wireless text messaging device 100 to receive such provided user input. In order to provide such functionality, the plurality of keys 106 includes a first plurality of keys 106A corresponding to alpha characters and numbers, and a second plurality of keys 106B corresponding to cursor movement directions and to a select/send option. The first plurality of keys 106A are used by a user to provide alpha and/or numeric input, including, for example, the names of potential text message addressees and their respective text message addresses, and the text of text messages to be sent to communication devices associated with such addressees. The second plurality of keys 106B are used by a user to provide input to the device 100 for moving the cursor 110 in an up, down, left, and/or right direction, for selecting a selectable item or option (including, for example and not limitation, the selection of a communication mode or a text message addressee), and/or for initiating the sending of a previously composed text message. Typically, the keys 106 of keypad 104 include mechanical key switches, membrane key switches, or other forms of key switches.

The housing 108 comprises a body that may be generally held in one of user's hands such that a user may use his/her other hand to actuate the keys 106 of keypad 104. The housing 108 defines openings 112, 114 extending through a surface thereof for respectively receiving the display 102 and keypad 104 therein such that the display 102 is viewable by a user and the keypad 104 is accessible to a user. Additionally, the housing 108 defines a void, or cavity, therein that receives and securely houses hardware components of the wireless text messaging device 100 described below with reference to FIG. 3. Generally, the housing 108 is manufactured from a plastic material that can withstand substantial abuse (including, but not limited to, dropping of the wireless text messaging device 100) and protect the hardware components of the wireless text messaging device 100.

Figure 2A:
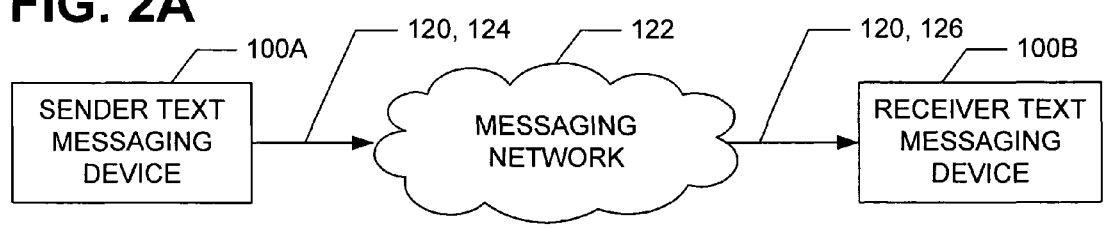
Figure 2B:
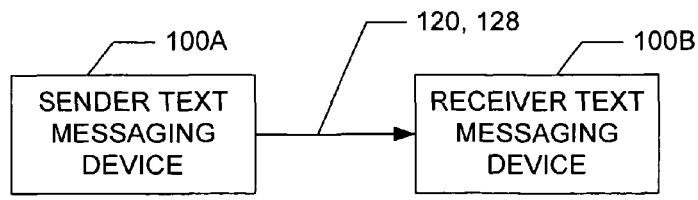

As briefly described above, the wireless text messaging device 100 is operable and configurable by a user thereof to communicate text messages with another communication device via a plurality of communication modes. Hence, the wireless text messaging device 100 may be referred to as a "multi-mode text messaging device 100". FIGS. 2A-2C display pictorial block diagram representations of the different communication modes in which the wireless text messaging device 100 is operable in accordance with the exemplary embodiment of the present invention. In FIGS. 2A-2C, the sender text messaging device 100A comprises a wireless text messaging device 100 used by a sender of a text message 120 and the receiver text messaging device 100B comprises a wireless text messaging device 100 used by a desired receiver of the text message 120.

According to the first communication mode illustrated by FIG. 2A, the sender text messaging device 100A attempts to communicate a text message 120 to the receiver text messaging device 100B only through a messaging network 122 (also sometimes referred to herein as a "messaging communication network 122") of a communication carrier. The messaging network 122 comprises wired and/or wireless infrastructure (including, but not limited to, receivers, transmitters, and/or transceivers) appropriate to communicate a text message 120 between a sender text messaging device 100A and a receiver text messaging device 100B. Thus, in accordance with the first communication mode, the sender text messaging device 100A wirelessly transmits the text message 120 to a receiver of the messaging network 122 using a wireless communication channel 124 and an appropriate network frequency assigned to the communication carrier and utilized by the messaging network 122 for the communication of a text message 120. After receiving the text message 120, the messaging network 122 uses its infrastructure to subsequently communicate, or forward, the text message 120 internally to one or more transmitter(s) thereof that then broadcast the text message 120 on a wireless communication channel 126 to the receiver text messaging device 100B on an appropriate network frequency. Such appropriate network frequency(ies), typically, correspond to those licensed to the communication carrier and that are used by the messaging network 122 for the communication of messages via the Short Messaging Service ("SMS"). If the communication of the text message 120 is successful, an acknowledgement signal is subsequently communicated to the sender text messaging device 100A from the messaging network 122, thereby informing the sender text messaging device 100A that the text message 120 has been received by the receiver text messaging device 100B.

Generally, a user of the sender text messaging device 100A configures the sender text messaging device 100A to utilize the first communication mode for sending a text message 120 when the user knows, or has reason to believe, that the receiver text messaging device 100B for a text message 120 is located at a substantial distance relative to the sender text messaging device 100A. If the user is correct and the receiver text messaging device 100B is distant from the sender text messaging device 100A, then use of the first communication mode by the sender text messaging device 100A may be the only method by which a text message 120 may be communicated to the receiver text messaging device 100B. However, if the receiver text messaging device 100B is not distant from and is, instead, proximate to the sender text messaging device 100A, use of the first communication mode unnecessarily ties up valuable messaging network 122 resources in order to communicate the text message 120 to the receiver text messaging device 100B.

In accordance with the second communication mode illustrated by FIG. 2B, a sender text messaging device 100A communicates a text message 120 to a receiver text messaging device 100B only via a non-network communication transport mechanism and one or more wireless communication channel(s) 128 used thereby. Typically, the non-network communication transport mechanism uses no infrastructure of a communication network and comprises a method for communicating data between two communication devices that are located relatively near one another. Due at least in part to the proximate locations of the two communication devices, such non-network communication transport mechanisms are often referred to as "proximity communication transport mechanisms". According to one exemplary embodiment of the present invention, the non-network communication transport mechanism includes the "Bluetooth" proximity communication transport mechanism. However, in other exemplary embodiments of the present invention and without limitation, the non-network communication transport mechanism includes other wireless communication transport mechanisms between proximally located sender and receiver text messaging devices 100A, 100B that use one or more frequency(ies) of the unlicensed free radio spectrum ("FRS") (e.g., a frequency(ies) not licensed to or used by a communication carrier) and, perhaps, ultra high frequency proximity communication transport mechanisms. Generally, such non-network communication transport mechanisms have limited range and, therefore, the distance between the sender and receiver text messaging devices 100A, 100B must often be small in comparison to the distances permitted between the sender and receiver text messaging devices 100A, 100B when a messaging network 122 is used to communicate a text message 120 therebetween.

In contrast to the first communication mode, the user of a sender text messaging device 100A configures the sender text messaging device 100A to utilize the second communication mode for communicating a text message 120 to the receiver text messaging device 100B when the user knows, or has reason to believe, that the receiver text messaging device 100B is located relatively near the sender text messaging device 100A. For example and not limitation, if the user of the sender text messaging device 100A knows that the receiver text message device 100B for a text message 120 is in the same room, on the same floor of a building, in the same building, or perhaps within a few miles, then the user should configure the sender text messaging device 100A to utilize the second communication mode. It should be noted that the applicability of use of the second communication mode by the sender text messaging device 100A depends on the particular non-network communication transport mechanism employed thereby for the communication of a text message 120 to a proximally located receiver text messaging device 100B. For example, if the Bluetooth proximity communication transport mechanism is employed by the sender text messaging device 100A, the receiver text messaging device 100B must be within approximately 30 feet of the sender text messaging device 100A in order to receive a text message 120 communicated by the sender text messaging device 100A. In further example, if another wireless proximity communication transport mechanism is employed by the sender text messaging device 100A, the receiver text messaging device 100B may be located, perhaps, up to five miles or more from the sender text messaging device 100A and receive a text message 120 therefrom. From the foregoing, it should be understood that the permissible distance for successful communications between the sender and receiver text messaging devices 100A, 100B for a particular non-network communication transport mechanism depends on the particular technology employed by such non-network communication transport mechanism and may be different for each different non-network communication transport mechanism.

If the user of a sender text messaging device 100A correctly ascertains that the sender and receiver text messaging devices 100A, 100B are not overly distant for use of the second communication mode, unnecessary use of the valuable resources of the messaging network 122 of a communication carrier is avoided by the user configuring the sender text messaging device 100A to communicate a text message 120 only via the non-network communication transport mechanism associated with the second communication mode. However, if the user is incorrect with respect to the distance between the sender and receiver text messaging devices 100A, 100B and erroneously configures the sender text messaging device 100A to communicate the text message 120 only via the second communication mode, the receiver text messaging device 100A will be unable to receive the text message 120.

According to a third communication mode illustrated in FIG. 2C and sometimes referred to herein as "auto-select mode" or "auto-select communication mode", the sender text messaging device 100A attempts to communicate a text message 120 to the receiver text messaging device 100B using a two stage process or method. Initially, during the first stage, the sender text messaging device 100A attempts to communicate the text message 120 to the receiver text messaging device 100B using a non-network communication transport mechanism of the second communication mode as described with reference to FIG. 2B above. If the sender text messaging device 100A is unable to successfully communicate the text message 120 to the receiver text messaging device 100B using a non-network communication transport mechanism within a reasonable period of time, the sender text messaging device 100A then automatically opts, or selects, to attempt communication of the text message 120 to the receiver text messaging device 100B in accordance with a second, alternative stage of the two stage process. During the second stage, the sender text messaging device attempts to communicate the text message 120 through a messaging network 122 of a communication carrier as described above with respect to FIG. 2A and as indicated by the dashed text message 120, messaging network 122, and communication channels 124, 126 in FIG. 2C.

By virtue of the sender text messaging device 100A being operable when configured in the third configuration mode to automatically self-select between the use of a non-network communication transport mechanism and a messaging network 122 for communicating a text message 120 to a receiver text messaging device 100B and in contrast to the use of the first and second communication modes described above, it is unnecessary for the user of the sender text messaging device 100A to attempt to determine the relative distance between the sender and receiver text messaging devices 100A, 100B when configuring the sender text messaging device 100A for operation. Further, operation of the sender text messaging device 100A in accordance with the third communication mode substantially prevents a text message 120 from not being received by a receiver text messaging device 100B due to the presence of too much distance between the sender and receiver text messaging devices 100A, 100B and avoids the unnecessary use of messaging network resources to communicate a text message 120 between proximate sender and receiver text messaging devices 100A, 100B.

FIG. 3 displays a block diagram representation of a wireless text messaging device 100 and the hardware components thereof in accordance with the exemplary embodiment of the present invention. The wireless text messaging device 100 comprises a bus 140, a processor 142, volatile memory 144 capable of storing data without losing any such data as long as electrical power is applied thereto, and non-volatile memory 146 capable of storing data without losing any such data regardless of whether electrical power is applied thereto. The bus 140 has a plurality of address, data, and control signal paths that render the bus 140 operable to communicate address, data, and control signals between the various hardware components. The processor 142 generally comprises a microprocessor, a controller, or other similar circuitry that is adapted to execute software instructions arranged in software programs or software modules in order to control the operation of the wireless text messaging device 100 and to cause the wireless text messaging device 100 to operate as described herein. Processor 142 is communicatively connected to bus 140 and is also adapted to communicate addresses, data, and control signals to the other hardware components via bus 140. The volatile memory 144 is operative to store input, intermediate, and/or temporary data received from the keypad 104 or generated by processor 142 for presentation to a user via display 102. Volatile memory 144 is communicatively connected to the bus 140 and is further operative to receive address and control signals from processor 142 via bus 140 and to bi-directionally communicate data with other hardware components of the wireless text messaging device 100 through bus 140.

The non-volatile memory 146 is connected to bus 140 for bi-directional communications therewith and is adapted to store a plurality of software program instructions associated with various software programs and/or modules which, when executed by processor 142, cause the wireless text messaging device 100 to operate and provide the functionality as described herein. The non-volatile memory 146 is also adapted to store configuration data identifying the then current communication mode in which the wireless text messaging device 100 is configured to operate (i.e., communication mode configuration data), and to store addressee data 160 associated with potential addressees 162, or receivers, for text messages 120.

Figure 4:
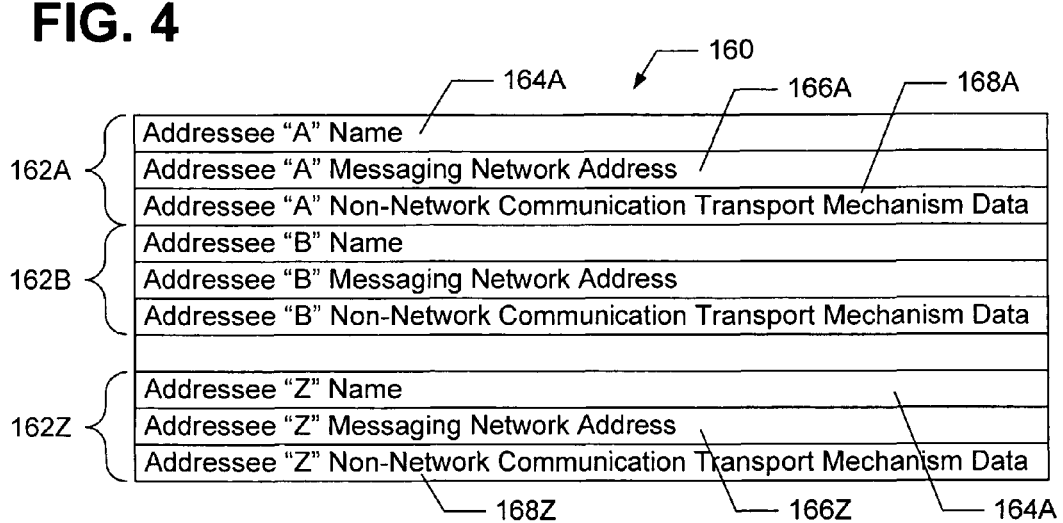
FIG. 4 is a block diagram representation of addressee data associated with potential addressees, or receivers, for text messages in accordance with the exemplary embodiment of the present invention.

As illustrated in FIG. 4, such addressee data 160 includes, for example and not limitation, an addressee name 164, messaging network address 166, and non-network communication transport mechanism data 168 for each potential text message addressee 162. The addressee names 164 for the potential text message addressees are displayed to a user of the wireless text messaging device 100 by processor 142 via display 102, as described below, to enable a user to select an addressee 162 for receipt of a text message 120. The messaging network address 166 associated with each potential text message addressee 162 (and, more particularly, with each addressee's wireless text messaging device 100) comprises data used by a messaging network 122 to communicate a text message 120 to the addressee's wireless text messaging device 100 in accordance with the first communication mode and in accordance with the second stage of the third communication mode if communication via a non-network communication transport mechanism is unsuccessful. Similarly, the non-network communication transport mechanism data 168 corresponding to each potential text message addressee 162 (and, more particularly, with each addressee's wireless text messaging device 100) includes data that is utilized by a non-network communication transport mechanism to communicate a text message 120 to the addressee's wireless text messaging device 100 according to the second communication mode and according to the first stage of the third communication mode. The non-network communication transport mechanism data 168 may include data for each different non-network communication transport mechanism that may be employed by the wireless text messaging device 100 to communicate text messages 120. For example, if the wireless text messaging device 100 uses the Bluetooth non-network communication transport mechanism to communicate text messages 120 according to the second communication mode and according to the first stage of the third communication mode, the non-network communication transport mechanism data 168 for each addressee 162 includes the Bluetooth signature identifier of the addressee's wireless text messaging device 100.

The wireless text messaging device 100, as displayed in FIG. 3, also comprises a transceiver interface 148, a transceiver 150, and an antenna 152. The transceiver 150 includes a transmitter and receiver for communicating text messages 120 and related data and information using antenna 152 indirectly with another wireless text message device 100 (i.e., a receiver text messaging device 100B) via a messaging network 122 or directly with another wireless text messaging device 100 (i.e., a receiver text messaging device 100B) via a non-network communication transport mechanism. Thus, the transmitter and receiver of the transceiver 150 and antenna 152 are each adapted to operate on one or more frequency(ies) as needed to enable the wireless text messaging device 100 to communicate text messages 120 via the different communication modes and stages thereof, if any, that are described herein. The transceiver interface 148 is communicatively connected to the bus 140 for the bi-directional communication of text messages 120 and related data and information with processor 142 via the bus 140. The transceiver interface 148 is also communicatively connected to the transceiver 150 for the bi-directional communication of text messages 120 and related data and information with the transceiver 150. The transceiver interface 148 is adapted to convert, as appropriate, text messages 120 and related data and information between forms thereof (for example and not limitation, analog and digital forms) used and/or required by the processor 142 and transceiver 150.

The wireless text messaging device 100 further comprises a display interface 154, a keypad interface 156, and a power supply 158 that are each connected to appropriate address, data, and control signal paths of bus 140. The display interface 154 is also communicatively connected to display 102 and is configured to receive information and/or data to be displayed on display 102 from processor 142 via bus 140 and to convert such information and/or data into signals necessary to cause the display thereof on display 102. Such information and/or data may include, for example and not limitation, options selectable by a user corresponding to functions that a user may desire for the wireless text messaging device 100 to perform (e.g., configure communication mode, display message inbox, display message outbox, manage address book, and send text message) and display panels associated therewith, addressee data 160, communication mode configuration data corresponding to the then currently configured communication mode, addressee names 164 corresponding to potential text message addressees 162, and the text of text messages 120.

The keypad interface 156 is also communicatively connected to keypad 104 for the receipt of signals therefrom representative of keys 106 that have been depressed or otherwise actuated by a user to provide input to the wireless text messaging device 100. The keypad interface 156 is adapted to convert such received signals into data in a form acceptable for use by processor 142 and to communicate such data to processor 142.

The power supply 158 comprises a source of electrical power for the wireless text messaging device 100. The power supply 158 provides such electrical power to the various hardware components of the wireless text messaging device 100 generally through bus 140, but may utilize direct connections to certain hardware components such as, for example, display 102 and keypad 104. The power supply 158 typically includes one or more rechargeable battery(ies) and appropriate components to regulate, filter, and convert electrical energy from the battery(ies) to the voltages and currents required by the various hardware components of the wireless text messaging device 100. It should be understood that the wireless text messaging device 100, like many similar devices, might alternatively be provided with electrical energy from an adapter that converts alternating current electrical power into direct current electrical power.

Figure 5:
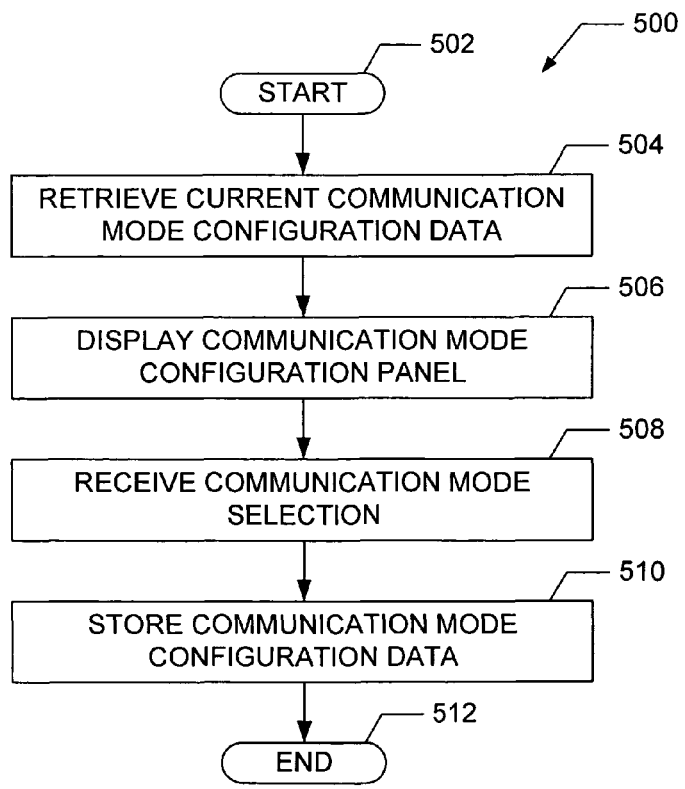
FIG. 5 is a flowchart representation of a method for configuring the communication mode of the wireless text messaging device of FIG. 1 in accordance with the exemplary embodiment of the present invention.

FIG. 5 displays a flowchart representation of a method 500 for configuring the communication mode of the wireless text messaging device 100 in accordance with the exemplary embodiment of the present invention. The method 500 comprises a plurality of steps that are performed generally in response to processor 142 executing a corresponding plurality of software program instructions stored in non-volatile memory 146 when method 500 is selected from display 102 by a user using the keys 106B of keypad 104 to appropriately position the cursor 110 and select the "configure communication mode" option as illustrated in FIG. 1. Operation of the wireless text messaging device 100 according to method 500 starts at step 502 where processor 142 performs appropriate initialization, if any, and advances to step 504 where processor 142 retrieves, from non-volatile memory 146, communication mode configuration data corresponding to the then current communication mode of the wireless text messaging device 100. Then, at step 506, processor 142 causes the display of the communication mode configuration panel 170 illustrated in FIG. 6 on display 102 with the cursor 110 positioned to indicate the then current communication mode. Communication mode configuration panel 170 includes a network only option 172 corresponding to the first communication mode, a non-network only option 174 corresponding to the second communication mode, and a network or non-network option 176 corresponding to the third communication mode.

Continuing at step 508, the processor 142 receives a selection of a communication mode from a user via keys 106B of keypad 104 and keypad interface 156. Generally, such selection is made by a user using keys 106B to position cursor 110 to a communication mode option corresponding to a desired communication mode and to select the communication mode option (and, hence, the desired communication mode). After receiving the selection of a communication mode, processor 142 moves to step 510 of method 500 where it stores communication mode configuration data in non-volatile memory 146 corresponding to the selected communication mode. Subsequent to storing such communication mode configuration data, text messages 120 communicated by the wireless text messaging device 100 will be communicated using the communication mode represented by the stored communication mode configuration data. Proceeding to step 512, processor 142 ceases operation in accordance with method 500.

Figure 7B:
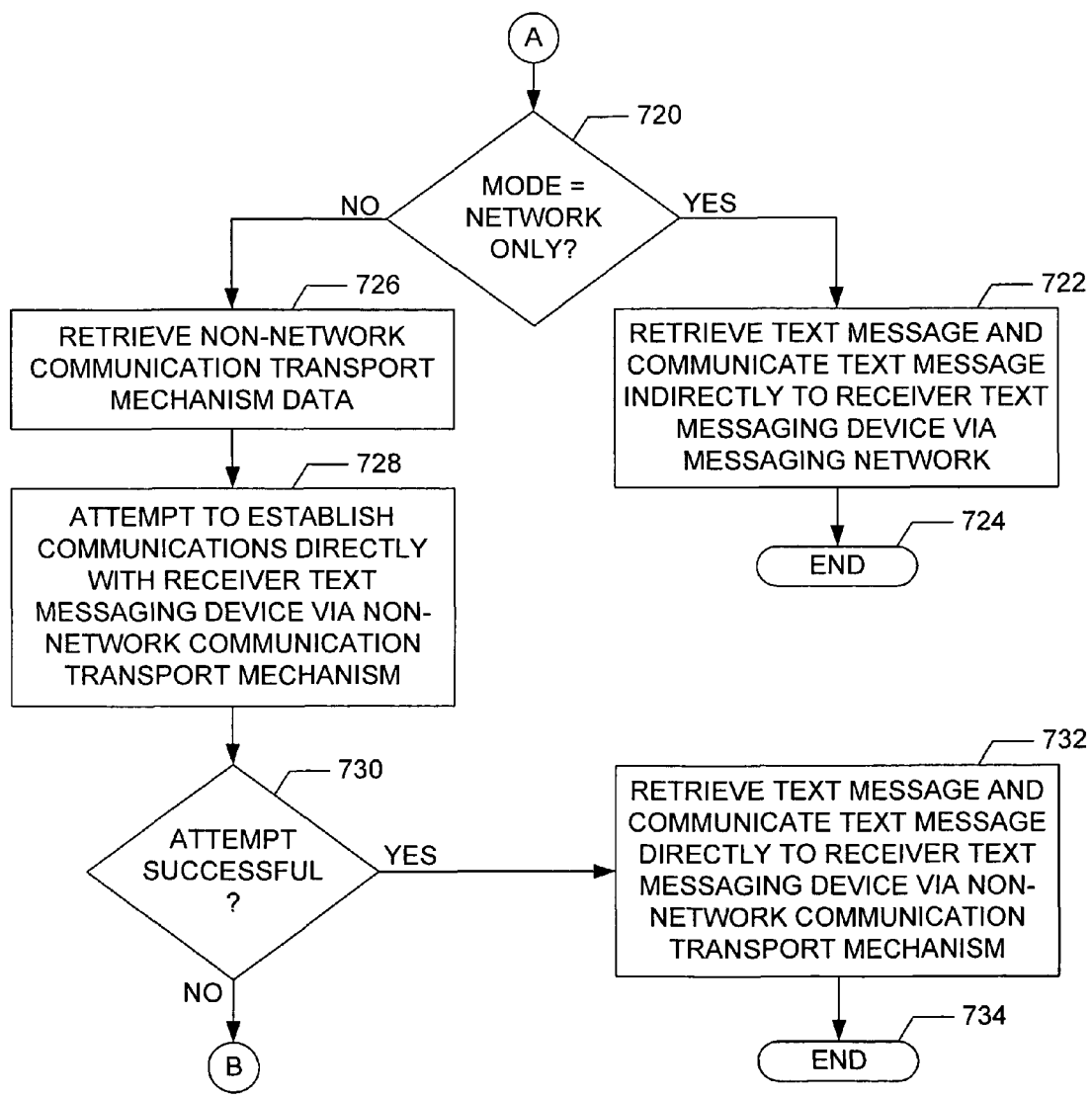
Figure 7C:
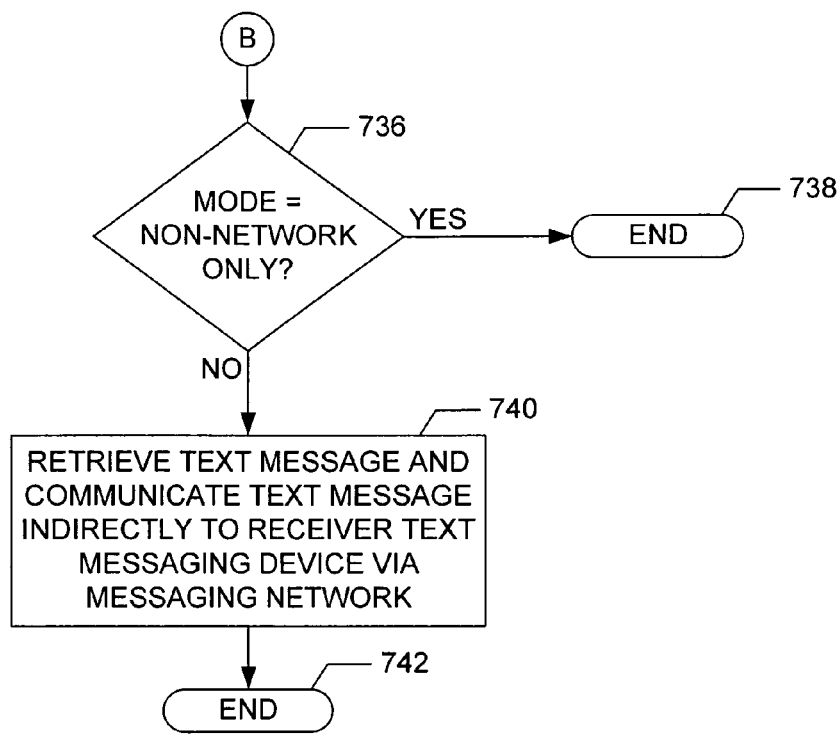

FIGS. 7A-7C display a flowchart representation of a method 700 for communicating a text message 120 used by the wireless text messaging device 100 in accordance with the exemplary embodiment of the present invention. The method 700 comprises a plurality of steps that are performed generally in response to processor 142 executing a corresponding plurality of software program instructions stored in non-volatile memory 146 when method 700 is selected from display 102 by a user using the keys 106B of keypad 104 to appropriately position the cursor 110 and select the "send text message" option as illustrated in FIG. 1. Operation of the wireless text messaging device 100 according to method 700 starts at step 702 where processor 142 performs appropriate initialization, if any, and advances to step 704 where processor 142 retrieves addressee data 160 stored in non-volatile memory 146. Then, at step 706, processor 142 causes the display of the addressee selection panel 180 illustrated in FIG. 8 on display 102, including the retrieved potential addressee names 164 for the text message 120. Next, at step 708, processor 142 receives a selection of an addressee name 164 (and, hence, an addressee 162) for the text message 120 from a user via keys 106B of keypad 104 and keypad interface 156. Generally, such selection is made by a user using keys 106B to position cursor 110 to an addressee name 164 corresponding to the desired addressee 162 for the text message 120 and to select the desired addressee 162 (and, hence, the desired addressee's messaging network address 166 and non-network communication transport mechanism data 168). After receiving the selection of an addressee 162 for the text message 120, processor 142 moves to step 710 of method 700 where it temporarily stores the selected addressee's name 164, messaging network address 166, and non-network communication transport mechanism data 168 in volatile memory 144.

Figure 9:
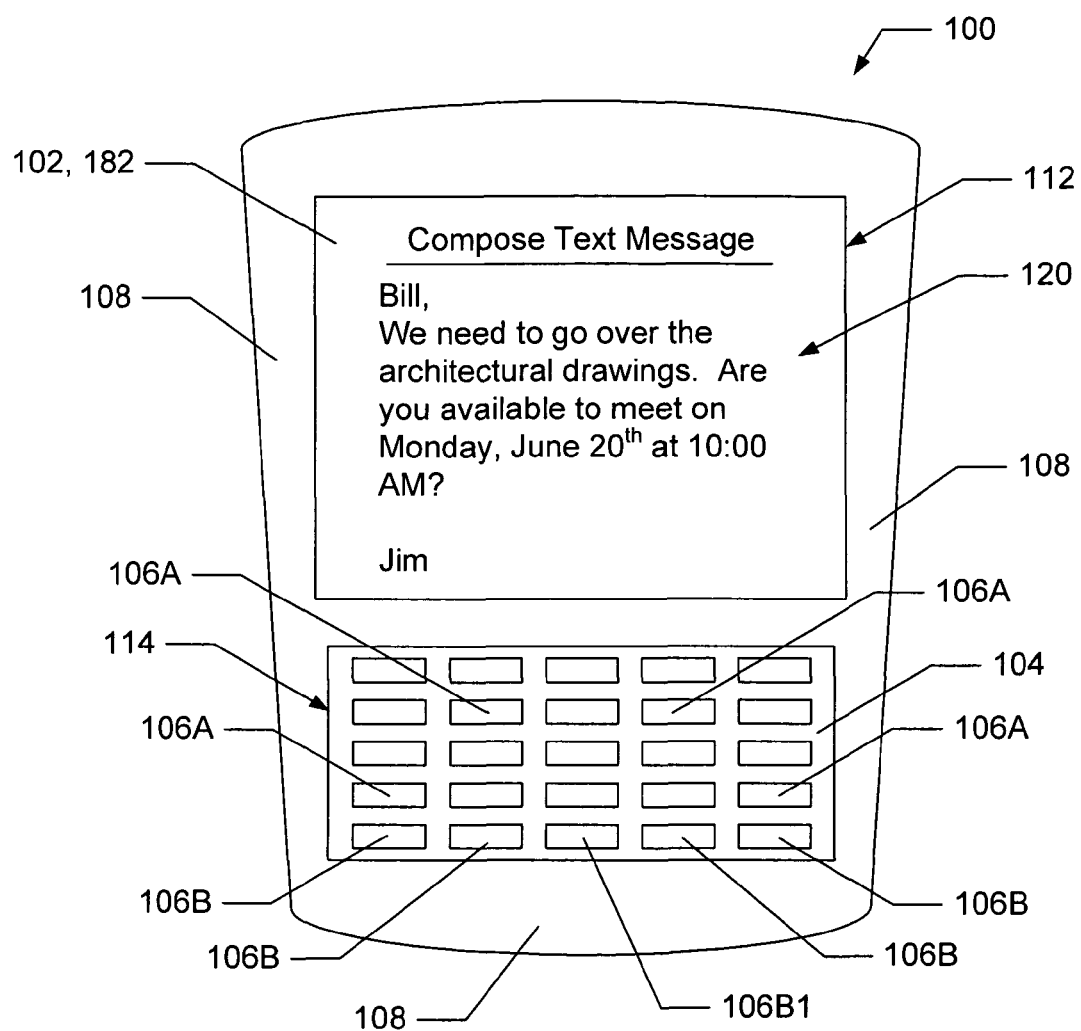
FIG. 9 is a pictorial representation of the wireless text messaging device of FIG. 1 displaying a compose text message panel in accordance with the exemplary embodiment of the present invention.

Proceeding to step 712 of method 700, processor 142 causes the display of a compose text message panel 182 illustrated in FIG. 9 on display 102. Processor 142 then receives, at step 714, the text message 120 from the user via keys 106 of keypad 104 and keypad interface 156, and temporarily stores the text message 120 in volatile memory 144 as it is received. Typically, the user enters and edits the text message 120 using keys 106 until he/she is ready to send the text message 120 to the selected addressee 162. Once the user has completed input of the text message 120, the user informs processor 142 as to such and instructs processor 142 to send the text message 120 by selecting (e.g., by depressing) a send key 106B1 and processor 142 receives the user's selection of the send key 106B1 (and, hence, the user's instruction or command to send the text message 120), at step 716, via keypad interface 156. After receiving the input of the send key 106B1 from the user, processor 142 retrieves the communication mode configuration data (including, the then current communication mode) from the non-volatile memory 146 at step 718.

Processor 142 determines, at step 720, whether the then current communication mode corresponds to the first communication mode (i.e., network only). If so, processor 142 moves to step 722 where it causes the text message 120 to be retrieved from volatile memory 144 and indirectly communicated by the wireless text messaging device 100 (e.g., acting in the capacity of a sender text messaging device 100A) to a wireless text messaging device 100 of the selected addressee 162 (e.g., acting in the capacity of a receiver text messaging device 100B) via a messaging network 122 of a communication carrier using the selected addressee's messaging network address 166. During such communication, the transceiver interface 148, transceiver 150, and antenna 152 are operated to transmit the text message 120 and messaging network address 166 on one or more appropriate frequency(ies) used by the messaging network 122. After completing such communication, processor 142 terminates operation in accordance with method 700 at step 724.

If, at step 720, processor 142 determines that the then current communication mode does not correspond to the first communication mode, processor 142 advances to step 726 of method 700 where it retrieves the non-network communication transport mechanism data 168, if any, stored in non-volatile memory 146 for the selected addressee 162. Then, using the retrieved non-network communication transport mechanism data 168 at step 728, processor 142 causes the wireless text messaging device 100 (e.g., acting in the capacity of a sender text messaging device 100A) to attempt to establish communications directly with the wireless text messaging device 100 of the selected addressee 162 (e.g., acting in the capacity of a receiver text messaging device 100B) via a non-network communication transport mechanism. More particularly, processor 142 causes the transceiver interface 148, transceiver 150, and antenna 152 to operate on one or more appropriate frequency(ies) used by the non-network communication transport mechanism and to attempt to establish communications directly with the receiver text messaging device 100B using the protocol of the non-network communication transport mechanism.

For example and not limitation, if the non-network communication transport mechanism comprises the Bluetooth proximity communication transport mechanism, processor 142 causes the transceiver interface 148, transceiver 150, and antenna 152 to operate on the frequency(ies) used by the Bluetooth proximity communication transport mechanism and uses the transceiver interface 148, transceiver 150, and antenna 152 to search for the receiver text messaging device 100B having a Bluetooth signature identifier matching the Bluetooth signature identifier of the selected addressee's non-network communication transport mechanism data 168. If the receiver text messaging device 100B is found, processor 142 then causes Bluetooth's pairing process to be performed with the receiver text messaging device 100B. It should be noted that if the wireless text messaging device 100 employs a non-network communication transport mechanism other than Bluetooth to communicate text messages 120 according to the second communication mode and according to the first stage of the third communication mode, a similar or perhaps different method of establishing communications with the receiver text messaging device 1008 may be utilized.

Continuing in accordance with method 700 at step 730, processor 142 ascertains whether the attempt to establish communications directly with the wireless text messaging device 100 of the selected addressee 162 (e.g., acting in the capacity of a receiver text messaging device 100B) was successful at step 726. If so, at step 732, processor 142 retrieves the text message 120 from volatile memory 144 and causes the transceiver interface 148, transceiver 150, and antenna 152 to communicate the text message 120 directly to the receiver text messaging device 100B using the non-network communication transport mechanism in accordance with the second communication mode (e.g., non-network only) or the first stage of the third communication mode (e.g., non-network). Processor 142 then ceases operation in accordance with method 700 at step 734.

If, at step 730, processor 142 ascertains that the attempt to establish communications directly with the wireless text messaging device 100 of the selected addressee (e.g., acting in the capacity of a receiver text messaging device 100B) was not successful, then processor 142 branches to step 736 where it decides whether the current communication mode corresponds to the second communication mode. If so, the operation of processor 142 according to method 700 is terminated at step 738 because direct communications could not be established with the wireless text messaging device 100 of the selected addressee (e.g., acting in the capacity of a receiver text messaging device 100B) and because according to the second communication mode, the text message 120 is to be communicated only by a non-network communication transport mechanism. If, at step 736, processor 142 decides that the current communication mode does not correspond to the second communication mode, then the current communication mode must correspond to the third communication mode and processor 142 advances to step 740 where it causes the text message 120 to be retrieved from volatile memory 144 and indirectly communicated, according to the second stage of the third communication mode, by the wireless text messaging device 100 (e.g., acting in the capacity of a sender text messaging device 100A) to a wireless text messaging device 100 of the selected addressee 162 (e.g., acting in the capacity of a receiver text messaging device 100B) via a messaging network 122 of a communication carrier as described above with respect to step 722. After completing such communication, processor 142 terminates operation in accordance with method 700 at step 742.

It should be understood that although the methods described herein receive input from a user of the wireless text messaging device 100 via keys 106, other embodiments of the present invention may utilize displays 102 having touch screen technology that enables the wireless text messaging device 100 to receive such input via a user touching a displayed item with a finger, stylus, or other pointing implement.

Whereas this invention has been described in detail with particular reference to exemplary embodiments and variations thereof, it is understood that other variations and modifications can be effected within the scope and spirit of the invention, as described herein before and as defined in the appended claims.

What is claimed is:

1. An apparatus for communicating a text message between a sender and a receiver, said apparatus comprising:
    a user interface for receiving a text message input by a sender;
    a circuitry connected to said user interface for receiving said text message from said user interface and for communicating said text message to a communication device of a receiver, said circuitry being operable in a first communication mode for communicating said text message to said communication device of said receiver via a fee-based communication network operating on a first frequency band and in a second communication mode for communicating said text message to said communication device of said receiver via a proximity communication transport mechanism operating on a second frequency band, said circuitry also operable to convert said text message into forms utilized by said first communication mode and said second communication mode;
    an addressee data, said addressee data stored on a memory, wherein said addressee data includes a messaging network address corresponding to said communication device of said receiver and is utilized to wirelessly connect to said receiver over said first communication mode to send said text message; and
    a proximity connection transport mechanism data, said proximity connection transport mechanism data stored on a memory, wherein said proximity connection transport mechanism data includes a signature identifier corresponding to said communication device of said receiver and is utilized to wirelessly connect to said receiver over said second communication mode to send said text message,
    wherein said circuitry is further operable to
        retrieve communication mode configuration data corresponding to a current mode of communication, the communication mode configuration data indicating that a user desires the current mode of communication as one of a network only option corresponding to the first communication mode, a direct connection only option corresponding to the second communication mode, and a network and direct connection option utilizing both the first and second communication modes,
        determine that the current mode of communication is not the network only option,
        attempt the establishment of communications with said communication device of said receiver using said second communication mode,
        automatically communicate said text message to said communication device of said receiver using said second communication mode if said attempt is successful with an acknowledgement signal communicated to said user interface informing said sender of a receipt of said text message,
        determine that the current mode of communication is not the direct connection only option if said attempt is unsuccessful,
        determine that the current mode of communication is the network and direction connection option, and
        automatically communicate said text message to said communication device of said receiver using said first communication mode.

2. The apparatus of claim 1, wherein said circuitry is further operable in said second communication mode for communicating said text message to said communication device of said receiver via a proximity communication transport mechanism.

3. The apparatus of claim 2, wherein said proximity communication transport mechanism comprises the Bluetooth proximity communication transport mechanism.

4. The apparatus of claim 2, wherein said proximity communication transport mechanism comprises an ultra high frequency proximity communication transport mechanism.

5. The apparatus of claim 1, wherein said circuitry is further operable in said second communication mode for communicating said text message to said communication device of said receiver via the unlicensed free radio spectrum.

6. The apparatus of claim 1, wherein said communication device of said receiver comprises a text messaging communication device.

7. The apparatus of claim 1, wherein said communication network comprises a messaging communication network.

8. The apparatus of claim 1, wherein said circuitry is configurable to operate only in said first communication mode or only in said second communication mode.

9. A method of communicating a text message from a first wireless device to a second wireless device, the first wireless device including communication mode configuration data corresponding to a current mode of communication, the communication mode configuration data indicating that a user desires the current mode of communication as one of a network only option corresponding to a fee-based communications network, a direct connection only option corresponding to a proximity communication transport mechanism, and a network and direct connection option utilizing both the fee-based and proximity communication modes, the method comprising:

- determining that the current mode of communication is not the network only option;
- transmitting a text message to the second wireless device from the first wireless device via the proximity communication transport mechanism operating on a first frequency band utilizing a signature identifier corresponding to said second wireless device, the signature identifier stored on a memory of the first wireless device, with an acknowledgement signal communicated to the first wireless device informing the first wireless device of a receipt of the text message by the second wireless device if the text message is received by the second wireless device;
- determining that the current mode of communication is not the direct connection only option if the text message is not received by the second wireless device;
- determine that the current mode of communication is the network and direction connection option;
- converting, if the text message is not received by the second wireless device, the text message into a form utilized by the fee-based communication network; and
- transmitting, if the text message is not received by the second wireless device, the text message from the first wireless device to the second wireless device via the fee-based communications network operating on a second frequency band utilizing a message network address corresponding to said second wireless device, the message network address stored on a memory of the first wireless device;
- wherein the proximity communication transport mechanism is attempted first so as to leave resources of the fee-based communication network available for other uses.

10. The method of claim 9, wherein the transmitting via a proximity communication transport mechanism further comprises transmitting the text message directly to the second wireless device.

11. The method of claim 9, wherein the transmitting via a proximity communication transport mechanism further comprises transmitting the text message to the second wireless device using a wireless communication channel.

12. The method of claim 9, further comprising ascertaining whether the second wireless device is within the communication range of a proximity communication transport mechanism.

13. The method of claim 9, wherein the transmitting via a fee-based network further comprises automatically transmitting the text message using a communication network absent human intervention.

\* \* \* \* \*